June 26, 1956 E. M. ROSCHKE 2,752,488

SUBSCRIPTION TELEVISION SYSTEM

Filed March 13, 1951 2 Sheets-Sheet 1

INVENTOR.
ERWIN M. ROSCHKE
BY Francis W. Crotty
ATTORNEY

SUBSCRIPTION TELEVISION SYSTEM

Filed March 13, 1951 2 Sheets-Sheet 2

INVENTOR.
ERWIN M. ROSCHKE
BY Francis W. Crotty
ATTORNEY

United States Patent Office 2,752,488

Patented June 26, 1956

2,752,488

SUBSCRIPTION TELEVISION SYSTEM

Erwin M. Roschke, Broadview, Ill., assignor to Zenith Radio Corporation, a corporation of Illinois Application March 13, 1951, Serial No. 215,249

5 Claims. (Cl. 250—27)

This invention relates to television systems, and more particularly to television systems of the subscription type in which a coded television signal is transmitted over a first signal channel, and a key signal for decoding the coded television signal is transmitted to subscriber receivers over a second signal channel.

Subscription television systems of the above type are disclosed and claimed in Patent No. 2,510,046, issued May 30, 1950, in the name of Ellett et al., entitled "Radio-Wire Signalling System," and in copending application Serial No. 773,848, filed September 13, 1947, in the name of Erwin M. Roschke, entitled "Image Transmission System," now issued as Patent 2,547,598, April 3, 1951, both assigned to the present assignee. The Roschke application discloses a system in which coding is effected by altering the relative timing between the video and synchronizing components of a television signal during spaced operating intervals or in accordance with a coding schedule. The coding schedule is indicated to subcriber receivers by means of a key signal which is transmitted thereto over a line circuit.

The present invention provides improved apparatus that may be used in the transmitter or receiver portions of the Roschke type of subscription system to provide coding or decoding of the television signal. This apparatus may be connected into the sweep circuit of a cathode-ray image-translating device and is constructed to alter the scansion of the device in response to an applied control signal and thereby effectively alter the timing of the video signal translated by the device.

It is, accordingly, an object of this invention to provide improved coding or decoding apparatus for use in a subscription type of television system.

A further object of this invention is to provide improved apparatus for use in a subscription type of television system which operates in a highly efficient manner to perform a coding or decoding function, and yet may be constructed inexpensively and conveniently.

The improved apparatus of this invention will be described in detail in conjunction with a subscriber receiver, although it is to be understood that the apparatus may also be used in a television transmitter to effect coding of the transmitted television signal.

Figure 1:
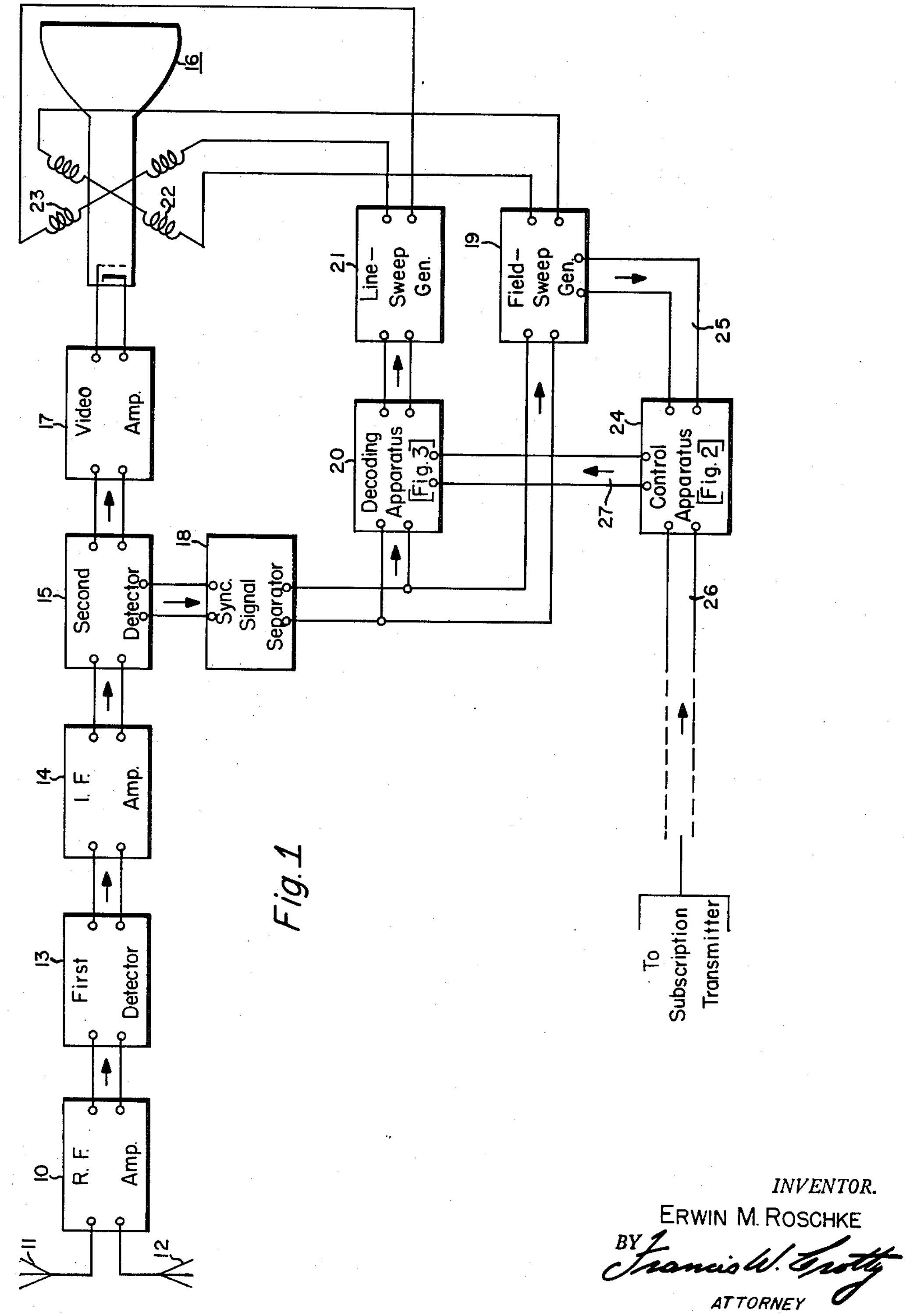
Figures 2, 3:
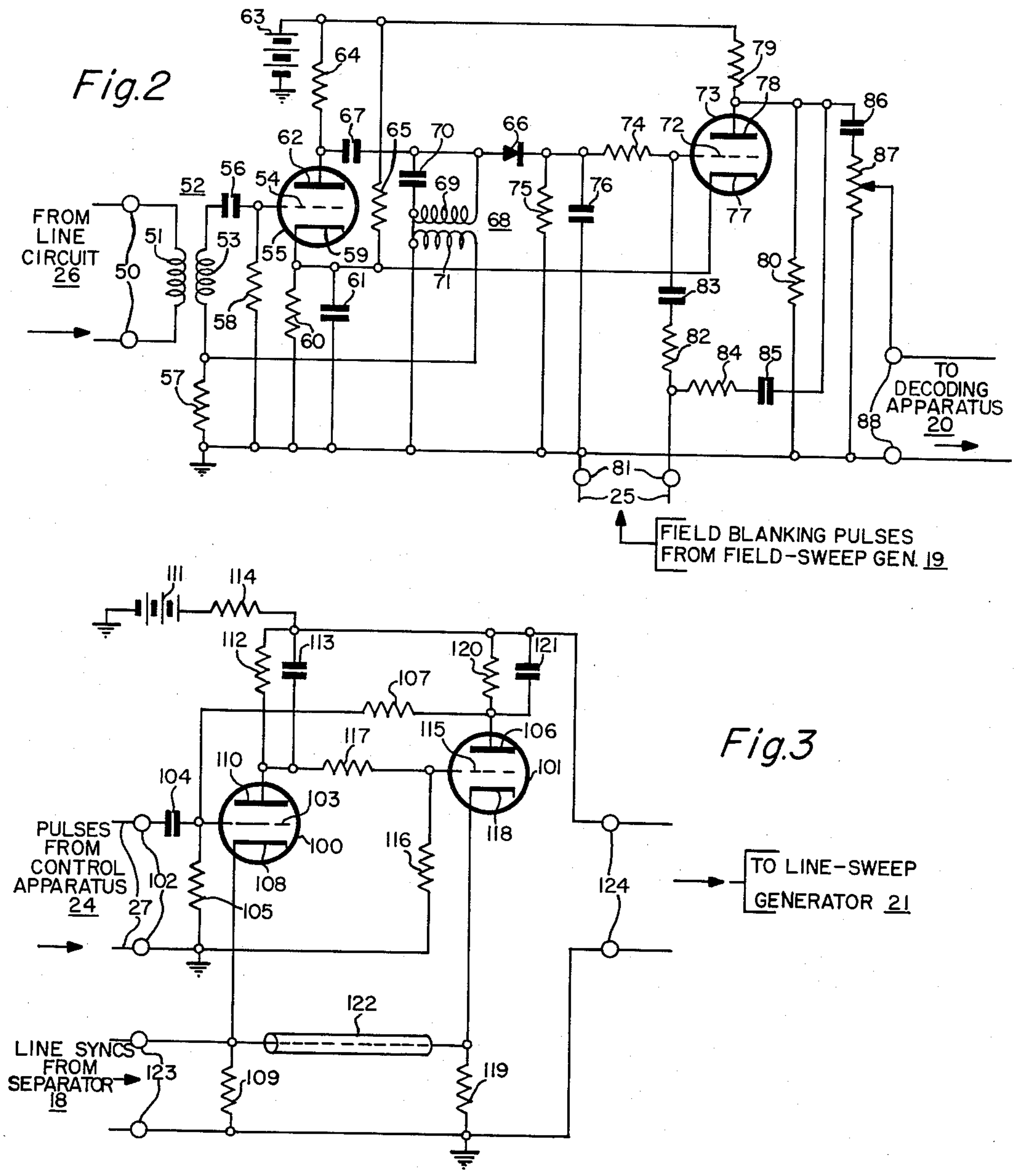

The features of this invention which are believed to be new are set forth with particularly in the appended claims. This invention itself, however, together with further objects and advantages thereof may best be understood by reference to the following description when taken in conjunction with the accompanying drawings, in which:

Figure 1 shows a television receiver suitable for operation in the subscription television system disclosed in the aforementioned Roschke application, Figure 2 is a detailed diagram of a control circuit that may be used in the receiver of Figure 1, and, Figure 3 is a detailed diagram of a decoding circuit constructed in accordance with the invention and used as a component of the receiver of Figure 1.

The television receiver illustrated in Figure 1 includes a radio-frequency amplifier 10 having input terminals connected to an antenna circuit 11, 12 and output terminals connected to a first detector 13. First detecor 13 is coupled to an intermediate-frequency amplifier 14 of any desired number of stages which, in turn, is connected to a second detector 15. The second detector is coupled to the input electrodes of a cathode-ray image-reproducing device 16 through a video amplifier 17 of one or more stages.

Second detector 15 is further connected to a synchronizing-signal separator 18 which is coupled to a field-sweep generator 19 and, through a decoding apparatus 20, to a line-sweep generator 21. Sweep generators 19 and 21 are connected respectively to field-deflection elements 22 and line-deflection elements 23 associated with reproducing device 16. Field-sweep generator 19 is connected to a control apparatus 24 by leads 25 and supplies field-blanking pulses thereto. The control apparatus is also connected to decoding apparatus 20 by way of leads 27 and to a line circuit 26 extending to the subscription transmitter.

The receiver may be tuned to a subscription television signal of the type transmitted in the system of the aforementioned Roschke application and in which the timing of the video components relative to the line-synchronizing components is altered during spaced operating intervals, the times of occurrence of these intervals being indicated to the receiver by bursts of key signal on line circuit 26. This television signal is intercepted by antenna circuit 11, 12, amplified in radio-frequency amplifier 10, and hererodyned to the selected intermediate frequency of the receiver in first detector 13. The resulting intermediate-frequency signal is amplified in intermediate-frequency amplifier 14 and detected in second detector 15 to produce a composite video signal. The video signal is amplified in amplifier 17 and applied to the input electrodes of reproducing device 16 to control the intensity of the cathode-ray beam developed therein in well-known fashion and in accordance with the image intelligence represented by the video signal.

The synchronizing components of the received television signal are separated therefrom by synchronizing-signal separator 18; the field-synchronizing components being applied to field-sweep generator 19, and the line-synchronizing components being applied through decoding apparatus 20 to line-sweep generator 21. Control apparatus 24, in response to the conjoint effect of key-signal bursts on line circuit 26 and field-blanking pulses on leads 25, produces a control signal on leads 27. The control signal actuates decoding apparatus 20 to alter the timing of the line-synchronizing components applied to line-sweep generator 21 in coincidence with the aforementioned alteration in the television signal to provide a compensation in the line scansion of reproducing device 16. This causes the television signal to be effectively decoded and enables device 16 to reproduce the image intelligence represented thereby.

As pointed out in the aforementioned Roschke application, it is preferable to initiate and terminate each of the key-signal bursts generated at the transmitter and applied to line circuit 26 a short time preceding the alterations in the timing of the components of the television signal indicated by the key-signal burst and to effect such alteration in timing during the field-retrace intervals immediately succeeding the initiation and termination of such key-signal burst. The purposes of this are twofold; it assures that slight time delays experienced in line circuit 26 by the key-signal burst have no effect on the proper coincident operation of the transmitter and receiver coding and decoding apparatus; and also, it provides that such timing alterations occur during field-retrace intervals to preclude any possibility of distortion in the image reproduced by device 16 that might arise should such alterations occur during trace intervals.

Control apparatus 24 is illustrated in detail in Figure 2 and may be similar to the control apparatus disclosed and claimed in copending application Serial No. 341,681, filed March 11, 1953, in the name of Pierce E. Reeves, entitled "Subscription Television Control Circuit" and assigned to the present assignee. The apparatus includes a pair of input terminals 50 which are connected to line circuit 26. The terminals 50 are further connected to the primary winding 51 of a transformer 52, the secondary winding 53 of this transformer being coupled to the control electrode 54 of an electron-discharge device 55 through a coupling capacitor 56 and to ground through a resistor 57. Control electrode 54 is connected to ground through a grid-leak resistor 58, and the cathode 59 of device 55 is connected to ground through a resistor 60 shunted by a capacitor 61. The anode 62 of device 55 is connected to the positive terminal of a source 63 of unidirectional potential through a load resistor 64, and cathode 59 is connected to this terminal through a resistor 65. Device 55 is employed as an amplifier to amplify the key signal received from line circuit 26 but in view of the cathode bias provided by the potentiometer arrangement of resistors 60 and 65, the amplifier responds only when the amplitude of the key signal exceeds a preselected threshold value.

Anode 62 of device 55 is coupled to a rectifier device 66 through a coupling capacitor 67. The amplifier is made regenerative by means of a transformer 68. The primary winding 69 of this transformer has one side directly connected to the junction of capacitor 67 and rectifier 66, and its other side coupled to this junction through a capacitor 70. The secondary winding 71 of transformer 68 has one side connected to the primary winding and to ground, and its other side connected to the junction of winding 53 and resistor 57. The rectifier 66 is connected to the control electrode 72 of an electron-discharge device 73 through a resistor 74, and the rectifier is connected to ground through a resistor 75 shunted by a capacitor 76. The cathode 77 of device 73 is directly connected to cathode 59 of device 55, and the anode 78 of device 73 is connected to the positive terminal of source 63 through a load resistor 79 and to ground through a resistor 80.

The control apparatus of Figure 2 has a second pair of input terminals 81 which are connected to field-sweep generator 19 by means of leads 25. One of the terminals 81 is grounded and the other is coupled to control electrode 72 of device 73 through a series-connected resistor 82 and a capacitor 83. The ungrounded terminal 81 is also coupled to anode 78 of device 73 through a series-connected resistor 84 and a capacitor 85.

Anode 78 is coupled to ground through a capacitor 86 and a resistor 87. Resistor 87 is made variable and a pair of output terminals 88 are connected respectively to ground and to a movable tap on the resistor. The output terminals are connected to decoding apparatus 20 over leads 27.

Field-blanking pulses of positive polarity from field-sweep generator 19 are impressed across terminals 81. These pulses are supplied to control electrode 72 of device 73 through network 82, 83 and to the junction of anode 78 and resistor 80 through network 84, 85. The bursts of key signal appearing on line circuit 26 are impressed across terminals 50, amplified in device 55, rectified by device 60 and supplied with negative polarity to control electrode 72. Throughout the interval of each rectified key-signal burst device 73 is rendered non-conductive, but at all other times it is in a conductive state. Therefore, during the intervals between bursts of key signal, the field-blanking pulses are amplified by device 73 and appear across resistor 87 with negative polarity for application to output terminals 88. In addition, the field-blanking pulses are applied directly to the output terminals by way of network 84, 85, 86, 87 but with positive polarity. The amplification of device 73 is, preferably, made such that under these conditions the resultant pulses appearing across the output terminals are of negative polarity and have an amplitude substantially equal to that of the field-blanking pulses applied to terminals 81. However, during the occurrence of each rectified burst of key signal, the field-blanking pulses are applied to the output terminals only by way of network 84, 85, 86, 87 with positive polarity. Therefore, the pulses developed across the output terminals are of negative polarity until the occurrence of each rectified burst of key signal, at which time the next succeeding pulses are of positive polarity. Moreover, the pulses developed across the output terminals following the termination of each such key-signal burst again are of negative polarity.

Decoding apparatus 20 which is constructed in accordance with the present invention is shown in detail in Figure 3 and includes a pair of electron-discharge devices 100, 101 connected to form a modified type of "single-shot" multivibrator. The decoding apparatus has a pair of input terminals 102 connected to control apparatus 24 by leads 27. One of the terminals 102 is grounded and the other is coupled to the control electrode 103 of discharge device 100 through a coupling capacitor 104, the control electrode being connected to ground through a resistor 105 and to anode 106 of device 101 through a resistor 107. The cathode 108 of device 100 is connected to ground through a resistor 109, and the anode 110 of this device is connected to the positive terminal of a unidirectional potential source 111 through a time-constant network comprising a resistor 112 and a shunt-connected capacitor 113, and through a load impedance 114.

The control electrode 115 of device 101 is connected to ground through a resistor 116 and to anode 110 of device 100 through a resistor 117. The cathode 118 of device 101 is connected to ground through a resistor 119, and anode 106 is connected to the positive terminal of source 111 through a time-constant network comprising a resistor 120 and a shunt-connected capacitor 121, and through load impedance 114. A delay line 122 is connected between cathode 108 and cathode 118, and acts to introduce a preselected time delay to pulses translated by device 101, to be described in more detail hereinafter.

The apparatus has a further pair of input terminals 123 connected to synchronizing-signal separator 18 of Figure 1 to derive positive-polarity line-synchronizing pulses of a given time duration therefrom. One of these terminals is connected to ground and the other to cathode 108. The apparatus includes a pair of output terminals 124 which are connected to line-sweep generator 21 of Figure 1. One of the output terminals is grounded and the other is connected to the junction of load impedance 114 and time-constant networks 112, 113 and 120, 121. Output terminals 124 together with load impedance 114 form an output circuit for the decoding apparatus.

The anodes, cathodes and control electrodes of devices 100, 101 are connected to form a modified type of flip-flop multivibrator circuit, as previously mentioned, that is, a multivibrator circuit which has two stable operating conditions, a first wherein device 100 is highly conductive and device 101 non-conductive, and a second wherein device 101 is highly conductive and device 100 non-conductive. The multivibrator may be triggered from its first to its second stable operating condition by a negative-polarity pulse applied to control electrode 103, and returned to its first stable operating condition by a succeeding positive-polarity pulse applied to this control electrode. The networks 112, 113 and 120, 121 included in the load circuits of discharge devices 100, 101 may be collectively termed a control network and has a time-constant long with respect to the given time duration of the line-synchronizing pulses so as to be unresponsive thereto. For this reason, the line-synchronizing pulses applied to terminals 123 have no triggering effect on the multivibrator circuit. The pulses from control apparatus 24 may be considered the triggering pulses, and they have a duration corresponding to the duration of the field-blanking pulses of the system. The time-constant of control network 112, 113, and 120, 121 with respect to the time duration of the triggering pulses applied to terminals 102 is sufficiently short that the network responds to these pulses, and they act to trigger the multivibrator circuit.

When the multivibrator circuit is in what may be considered its first stable operating condition device 100 is conductive and device 101 non-conductive, and the positive-polarity pulses applied across terminals 123 are translated by device 100 and repeated across load impedance 114 and, hence, across output terminals 124 with inverted polarity but with unaltered timing.

On the other hand, when the multivibrator is in what may be considered its second operating condition, device 101 is conductive and device 100 non-conductive, and the pulses applied across terminals 123 are repeated by device 101 but not by device 100. However, these pulses are applied to cathode resistor 119 of device 101 through delay line 122, so that the pulses repeated by this device are delayed relative to the input pulses by an amount determined by the characteristics of the delay line. Therefore, each time the multivibrator is triggered by the triggering pulses from control apparatus 24, the timing of the repeated pulses is selectively changed from one value to another. The delay exhibited by line 122 is such that the alteration in the timing of the output pulses from the decoder corresponds in magnitude and occurrence to the alteration in timing of the components of the received television signal but is in a compensating sense as required to effect image-reproduction in device 16.

The invention provides, therefore, improved apparatus which may be used in a television transmitter or receiver to perform a coding or decoding function. This improved apparatus may be constructed simply and expediently, since it is composed of relatively few component parts with relatively uncomplicated associated circuitry. Moreover, the apparatus is highly stable and acts in an improved and efficient manner to perform its function in the subscription television system. While the invention has been described in conjunction with a subscription television system, it is apparent that it need not be applied solely to such apparatus, but may find application in any system wherein it is required to impart a predetermined delay characteristic to a periodic signal at certain intervals.

While a particular embodiment of the invention has been shown and described modifications may be made and it is intended in the appended claims to cover all such modifications as may fall within the true spirit and scope of the invention.

I claim:

1. Apparatus for repeating pulses of a given time duration and for selectively changing the timing of such pulses in accordance with a coding schedule comprising: a trigger circuit, including a pair of cross-connected electron-discharge devices, having two alternate stable operating conditions in each of which one of said devices is predominantly conductive; a delay line connected to at least one of said devices for introducing a preselected time delay to pulses translated thereby; means for applying to both of said devices pulses of a given duration to be repeated; a common output circuit for said devices for connection to a utilizing circuit; a control network included in said trigger circuit and having a time-constant long with respect to said given time duration so as to render said trigger circuit unresponsive to pulses of said given duration; and means for supplying to one of said devices triggering pulses having a duration long relative to said given duration and in accordance with a coding schedule.

2. Apparatus for repeating pulses of a given time duration and for selectively changing the timing of such pulses in accordance with a coding schedule comprising: a trigger circuit, including a pair of cross-connected electron-discharge devices, having two alternate stable operating conditions in each of which one of said devices is predominantly conductive; a delay line connected to at least one of said devices for introducing a preselected time delay to pulses translated thereby; means for applying to both of said devices pulses of a given duration to be repeated; a common output circuit for said devices for connection to a utilizing circuit; a pair of control networks respectively in circuit with said devices for actuating said trigger circuit from one to the other of its operating conditions and each having a time-constant long with respect to said given time duration so as to be unresponsive to pulses of said given duration; and means for supplying to one of said devices triggering pulses having a duration long relative to said given duration and in accordance with a coding schedule.

3. Apparatus for repeating pulses of a given time duration and for selectively changing the timing of such pulses in accordance with a coding schedule comprising: a trigger circuit, including a pair of cross-connected electron-discharge devices, having two alternate stable operating conditions in each of which one of said devices is conductive and one is non-conductive; a delay line connected to at least one of said devices for introducing a preselected time delay to pulses translated thereby; means for applying to both of said devices pulses of a given duration to be repeated; a common output circuit for said devices for connection to a utilizing circuit; a control network included in said trigger circuit and having a time-constant long with respect to said given time duration so as to render said trigger circuit unresponsive to pulses of said given duration; and means for supplying to one of said devices triggering pulses having a duration long relative to said given duration and in accordance with a coding schedule.

4. Apparatus for repeating pulses of a given time duration and for selectively changing the timing of such pulses in accordance with a coding schedule comprising: a trigger circuit, including a pair of cross-connected electron-discharge devices, having two alternate stable operating conditions in each of which one of said devices is predominantly conductive; a delay line connected to at least one of said devices for introducing a preselected time delay to pulses translated thereby; means for applying to both of said devices pulses of a given duration to be repeated; a common output circuit for said devices for producing said repeated pulses with fixed polarity in each of said stable operating conditions; a control network included in said trigger circuit and having a time-constant long with respect to said given time duration so as to render said trigger circuit unresponsive to pulses of said given duration; and means for supplying to one of said devices triggering pulses having a duration long relative to said given duration and in accordance with a coding schedule.

5. Apparatus for repeating pulses of a given time duration and for selectively changing the timing of such pulses in accordance with a coding schedule comprising: a trigger circuit including a pair of cross-connected electron-dischage devices each having an anode, a cathode and a control electrode, said trigger circuit having two alternate stable operating conditions in each of which one of said devices is predominantly conductive; a delay line connected between the cathodes of said devices for introducing a preselected time delay to pulses translated by one of said devices; means for applying to the cathode of one of said devices pulses of a given duration to be repeated; a common output circuit for said devices connected to said anodes and cathodes; a pair of control networks respectively in circuit with said anodes of said devices for actuating said trigger circuit from one to the other of its operating conditions and each having a time-constant long with respect to said given duration so as to be unresponsive to pulses of said given duration; and means for supplying to the control electrode of one of said devices triggering pulses having a duration long relative to said given duration and in accordance with a coding schedule.

References Cited in the file of this patent

UNITED STATES PATENTS

| | | |
|---|---|---|
| 2,212,967 | White | Aug. 27, 1940 |
| 2,436,516 | Larson et al. | Feb. 24, 1948 |
| 2,445,448 | Miller | July 20, 1948 |
| 2,559,661 | Reeves | July 10, 1951 |
| 2,570,221 | Earp et al. | Oct. 9, 1951 |
| 2,596,199 | Bennett | May 13, 1952 |

OTHER REFERENCES

"Waveforms" of Radiation Laboratory Series, vol. 19, pages 386–388, published by McGraw-Hill Co.